(12) United States Patent
James

(10) Patent No.: US 9,387,933 B2
(45) Date of Patent: Jul. 12, 2016

(54) LADDER CASCADE TORQUE BOX

(71) Applicant: Rohr, Inc., Chula Vista, CA (US)

(72) Inventor: Norman John James, San Diego, CA (US)

(73) Assignee: ROHR, INC., Chula Vista, CA (US)

(*) Notice: Subject to any disclaimer, the term of this patent is extended or adjusted under 35 U.S.C. 154(b) by 159 days.

(21) Appl. No.: 14/262,241

(22) Filed: Apr. 25, 2014

(65) Prior Publication Data

US 2015/0308376 A1 Oct. 29, 2015

(51) Int. Cl.
*B64D 29/00* (2006.01)
*F02K 1/72* (2006.01)
*F02K 1/64* (2006.01)
*F02K 1/76* (2006.01)
*B64D 27/26* (2006.01)

(52) U.S. Cl.
CPC . *B64D 29/00* (2013.01); *F02K 1/64* (2013.01); *F02K 1/72* (2013.01); *F02K 1/763* (2013.01); *B64D 2027/264* (2013.01); *Y02T 50/672* (2013.01)

(58) Field of Classification Search
CPC ............... F02K 1/64; F02K 1/72; F02K 1/73; F02K 1/763; B64D 29/00; B64D 2027/264
See application file for complete search history.

(56) References Cited

U.S. PATENT DOCUMENTS

| | | | | |
|---|---|---|---|---|
| 5,239,822 A | * | 8/1993 | Buchacher | ............. B64D 29/00 244/110 B |
| 6,968,675 B2 | * | 11/2005 | Ramlaoui | ................ F02K 1/72 60/226.1 |

* cited by examiner

*Primary Examiner* — Gerald L Sung
*Assistant Examiner* — William Breazeal
(74) *Attorney, Agent, or Firm* — Snell & Wilmer LLP

(57) ABSTRACT

Torque boxes and thrust reversers are disclosed. Torque boxes include a torque box comprising a hinge beam, a forward wall having a bullnose profile connected to the hinge beam to support a torque load, an aft wall having a bullnose profile connected to the hinge beam to support the torque load, the aft wall located aft of the forward wall, and a vane connected to an aft surface of the forward wall and a forward surface of the aft wall, wherein the aft surface of the forward wall and the forward surface of the aft wall are configured to direct air flow in a forward direction and the vane is configured to direct air flow radially outward. Thrust reversers include a translating sleeve, a blocker door mounted to the translating sleeve, and a torque box.

15 Claims, 9 Drawing Sheets

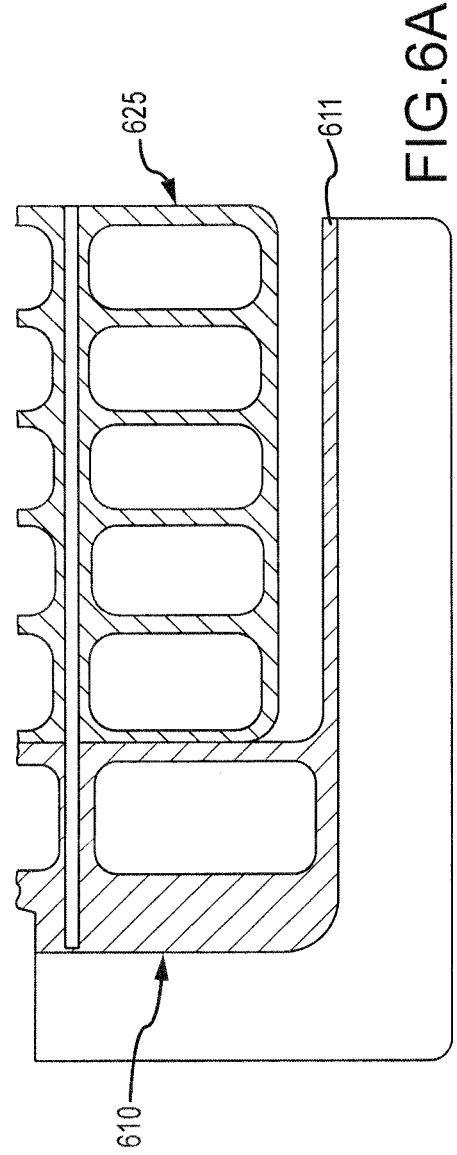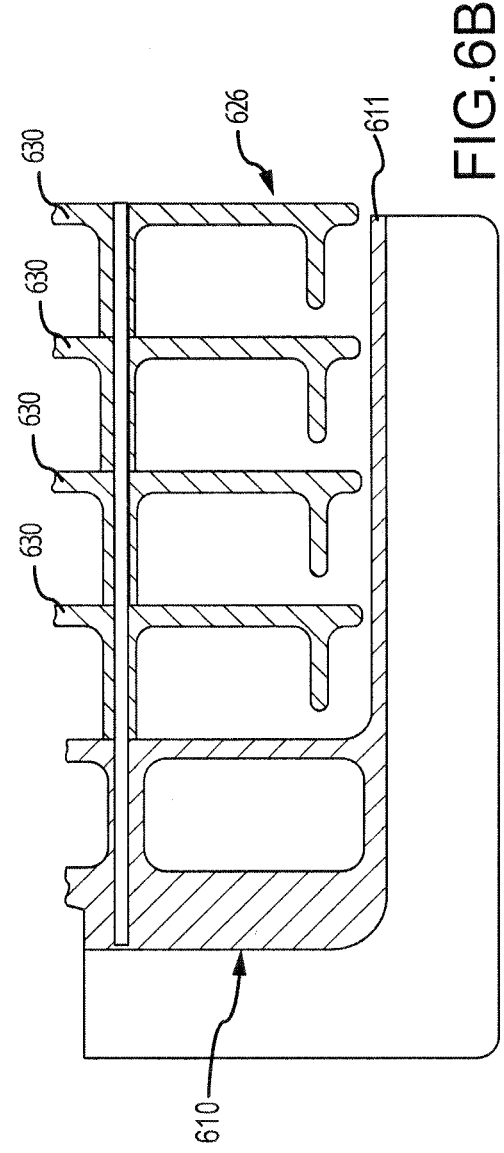

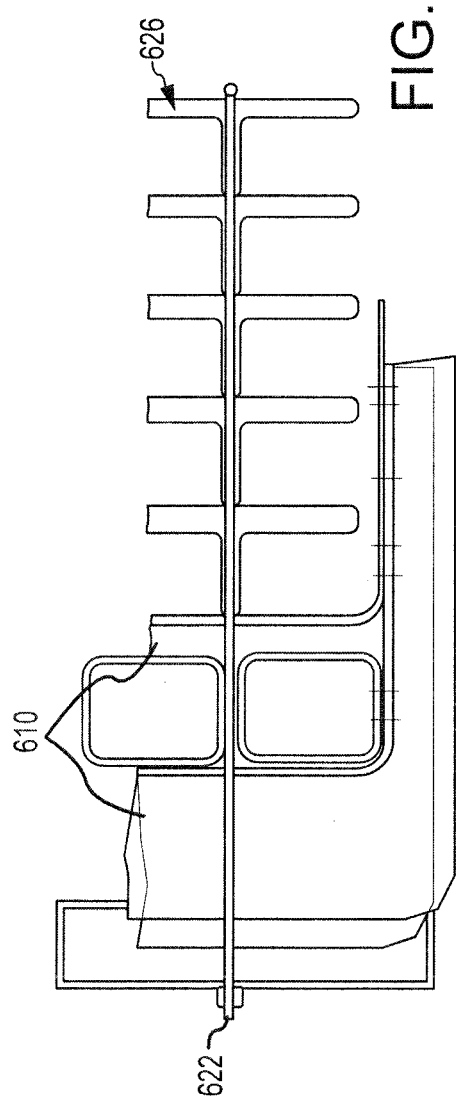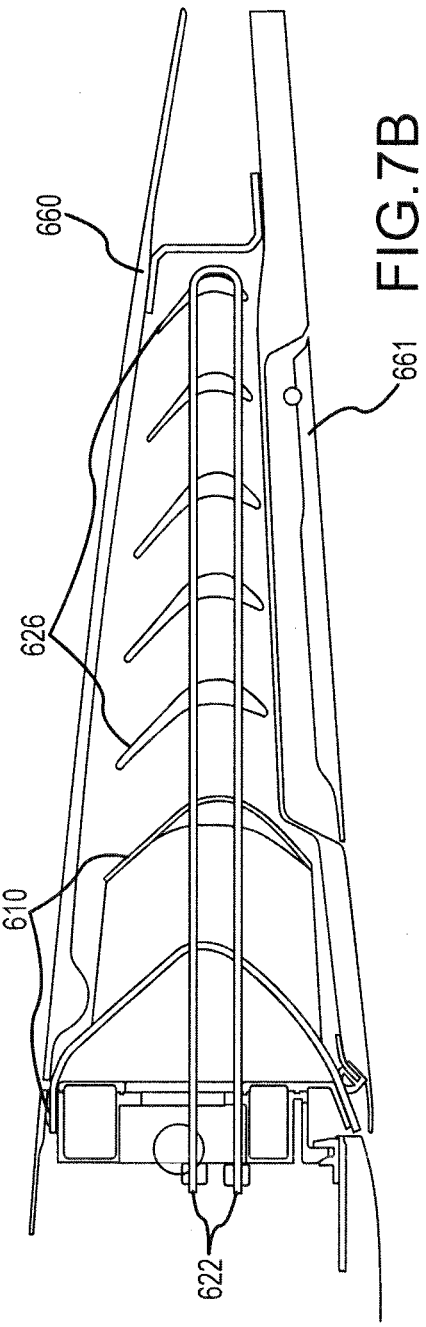

LADDER CASCADE TORQUE BOX

FIELD

The present disclosure relates to torque boxes for thrust reversers.

BACKGROUND

Jet aircraft nacelles (such as those found on modern commercial aircraft) typically include thrust reversing systems (also referred to as thrust reversers). Thrust reversers may be used to help slow the speed of an aircraft, for example during landing. Some conventional thrust reversers may include a torque box at a forward portion of the thrust reverser to sustain and transfer torque and reverser aerodynamic loads.

SUMMARY

Torque boxes are provided comprising a hinge beam, a forward wall having a bullnose profile connected to the hinge beam to support a torque load, an aft wall having a bullnose profile connected to the hinge beam to support the torque load, the aft wall located aft of the forward wall, and a vane connected to an aft surface of the forward wall and a forward surface of the aft wall, wherein the aft surface of the forward wall and the forward surface of the aft wall are configured to direct air flow in a forward direction and the vane is configured to direct air flow radially outward.

Thrust reversers are also provided comprising a translating sleeve, a blocker door mounted to the translating sleeve, and a torque box comprising a hinge beam, a forward wall having a bullnose profile connected to the hinge beam to support a torque load, an aft wall having a bullnose profile connected to the hinge beam to support the torque load, the aft wall located aft of the forward wall, and a vane connected to an aft surface of the forward wall and a forward surface of the aft wall, wherein the aft surface of the forward wall and the forward surface of the aft wall are configured to direct air flow in a forward direction and the vane is configured to direct air flow radially outward.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIGS. 6A and 6B illustrate torque boxes and cascades in accordance with various embodiments; and FIGS. 7A and 7B illustrate a torque box and cascade in accordance with various embodiments.

DETAILED DESCRIPTION

Figure 1:
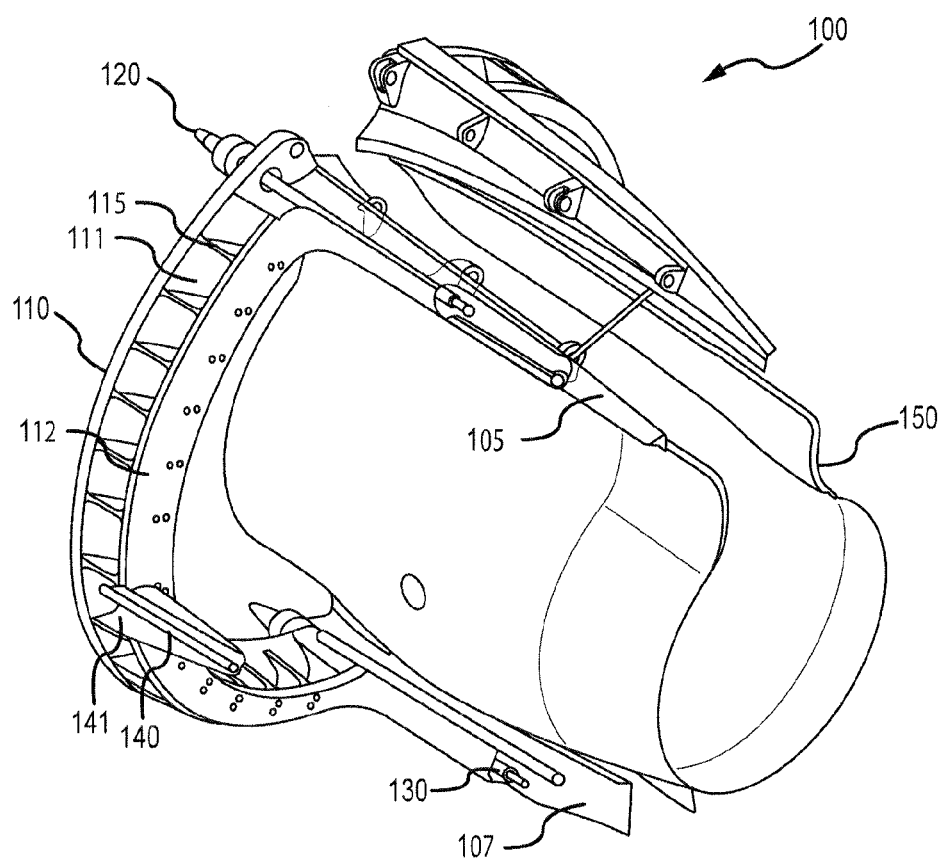
FIG. 1 illustrates a thrust reverser, in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "outboard" may define an element or portion of an element that is situated radially outer to or away from another, radially inward, element or portion of an element. Thus, an engine core may be situated radially inboard of an inner fixed structure and/or a fan casing. As used herein, "inboard" may define the element or portion of the element that is situated radially inward in relation to an outboard element.

As described above, a typical nacelle includes a thrust reversing system (which may be referred to as a thrust reverser). The thrust reverser may comprise a torque box, a cascade array, a translating sleeve, and a plurality of blocker doors. In various embodiments, the thrust reverser may be a cascadeless-thrust-reverser and, thus, may comprise a torque box, a translating sleeve, and a plurality of blocker doors. In various embodiments, the thrust reverser may comprise a cascade array or "cascade." The cascade may comprise a plurality of vents that redirect airflow during certain operations (e.g., landing) to generate reverse thrust. The translating sleeve may comprise a structure situated, in a stowed configuration, concentrically around the cascade array. The blocker doors may be pivotally coupled (e.g., by way of one or more joints or hinges) to the translating sleeve.

The torque box is generally cylindrical and may provide structural support to a thrust reverser, for example, when the thrust reverser is hinged open from the upper hinge beam (e.g., during service and engine change-out). When the thrust reverser is hinged closed and latched together, the torque box may have sufficient stiffness so as not to flex and disengage from the locking groove. Further, in various embodiments, reverse thrust aerodynamic loads may not cause the thrust reverser to disengage from the locking groove. In various embodiments, the torque box may help transfer aerodynamic thrust reverser loads forward to the aft fan case. Thus, the torque box is typically configured as a load bearing structure.

Torque boxes also serve to help provide efficient aerodynamic surfaces to transition blocked duct flow forward (e.g., from a blocker door). This can often be aided with the addition of cascade arrays to help direct air flow radially outward and/or forward.

The cascade array may comprise a plurality of vents that selectively redirect airflow during certain operations (e.g., landing) to generate reverse thrust when the thrust reverser is deployed. Cascade arrays are typically comprised of carbon fiber composite grids because of their light weight and structure. However, some cascades shapes may have angled surfaces that may result in undercuts in axial and traverse directions, which may involve expensive tooling and labor intensive handling. Accordingly, due to some costs of cascades, efforts have been expended to eliminate and/or reduce the use of cascades.

The translating sleeve comprises a structure situated, in a stowed configuration, concentrically about the torque box and in various embodiments, around a cascade array. The blocker doors are coupled to the translating sleeve, and lower or deploy (within a bypass air duct defined by the translating sleeve inner surface and an internal fixed structure outer surface) to redirect fan air through the cascade array. The translating sleeve may be coupled to one or more track beams each of which may help define a linear track or bearing along which the translating sleeve rides. Each track beam may be coupled to the torque box on an end thereof.

During a thrust reversing operation, the translating sleeve is urged aft by a series of thrust reverser actuator assemblies ("TRAs"). In various embodiments, each TRA may be in close proximity to the beam sliders. In various embodiments, the TRAs may extend between cascade modules and may be coupled to a translating sleeve and the torque box. When the TRAs extend, the translating sleeve translates, as described above, along the track beam. As the translating sleeve translates aft, the cascade array is exposed, and the blocker doors are lowered into the bypass air duct. As this occurs, airflow is redirected by the blocker doors.

In various embodiments, and with reference to FIG. 1, a thrust reverser 100 may comprise a torque box 110 coupled to inner fixed structure 150. Torque box 110 may comprise a forward wall 111 and an aft wall 112 coupled to hinge beam 105. Vane 115 may connect forward wall 111 to aft wall 112. Upper TRA 120 may be disposed in the hinge beam 105 and, in various embodiments, and lower TRA 130 in the latch beam 107, so as to allow for the translating sleeve (not shown) to translate. In various embodiments, thrust reverser 100 may also comprise a track guide 140 proximal to a flow divider 141.

Figure 2A:
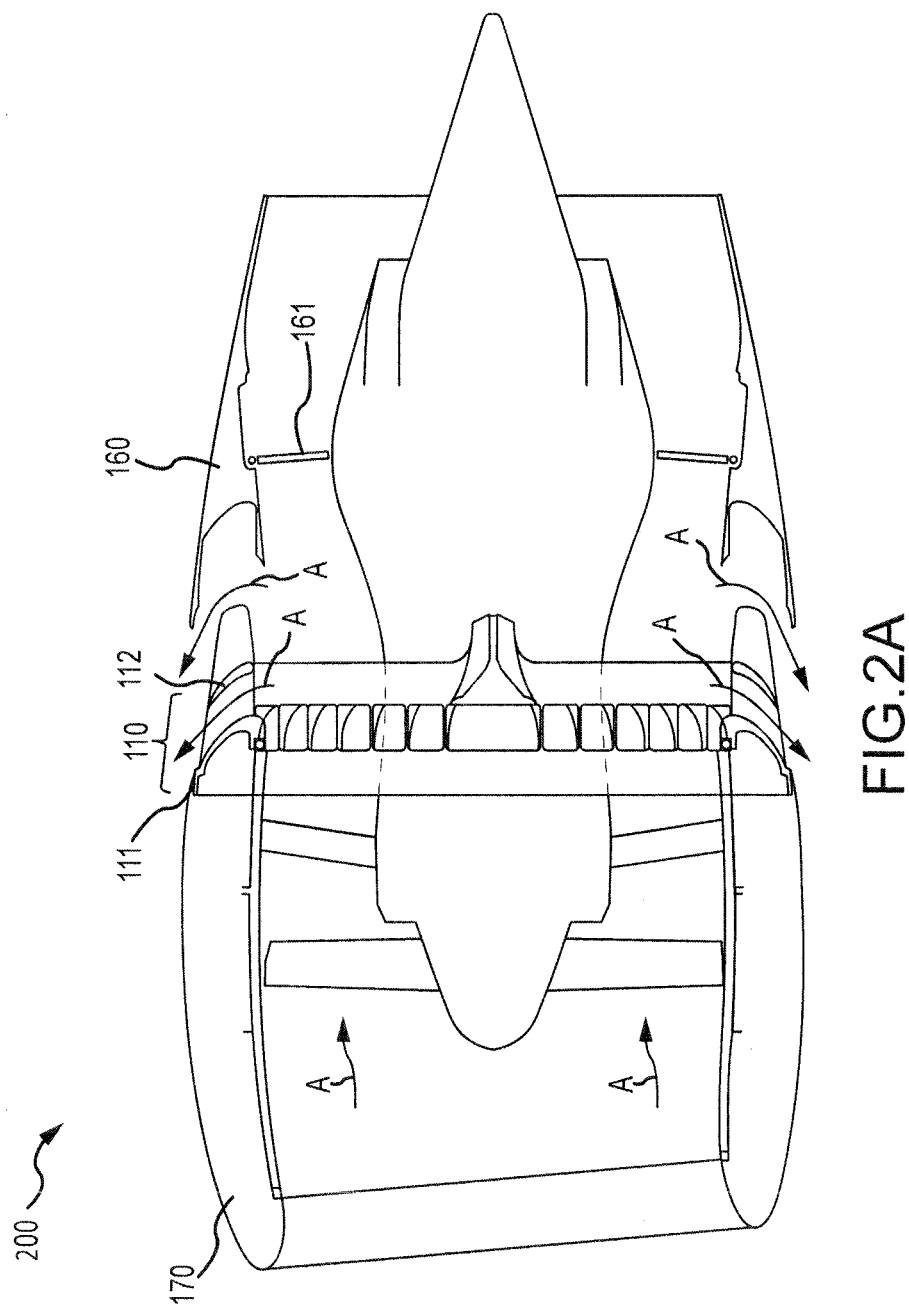
FIG. 2A illustrates a longitudinal section view of a thrust reverser in thrust reverser mode, in accordance with various embodiments.

With reference to FIG. 2A, a longitudinal sectional view of a thrust reverser are shown according to various embodiments. Thrust reverser 200 may comprise torque box 110 connected to fan cowl 170 and translating sleeve 160. Torque box 110 may comprise a forward wall 111 and an aft wall 112. According to various embodiments, both forward wall 111 and aft wall 112 may have a bullnose profile and may be coupled to the hinge beam 105 (illustrated above in FIG. 1). In various embodiments, aft wall 112 may provide sufficient back-pressure to allow for the axial shortening of forward wall 111 and, thus, may aid in shortening the overall length of thrust reverser 200.

As used herein the term "bullnose" may include a curved portion of the torque box and/or a ramp fairing portion of the torque box designed to redirect airflow during deployment and may generally describe a profile having the shape of an arc of an ellipse. According to various embodiments the forward and/or aft wall may have an ellipse ratio of about 2.25:1 to about 1.35:1, of about 2.15:1 to about 1.55:1, and of about 2:1, wherein the term "about" in this context means ±0.05. As used herein, the term "ellipse ratio" may include the aspect ratio, which is the ratio of the major axis (e.g., along the longitudinal axis of the torque box) to the minor axis (e.g., along a radius of the torque box). Accordingly, in various embodiments, a bullnose profile of a forward wall of a torque box having an ellipse ratio of about 2:1 would have a curvature similar to a portion of an ellipse which had a major axis about twice the size of the minor axis.

FIG. 2A illustrates translating sleeve 160 in the deployed or open position. When translating sleeve 160 is deployed, blocker door 161 may also become deployed according to various embodiments, blocking airflow, as indicated by arrows A, in the aft direction. The blocking of the airflow may cause back-pressure which may help to direct air flow between forward wall 111 and aft wall 112 and between aft wall 112 and translating sleeve 160.

Figure 2B:
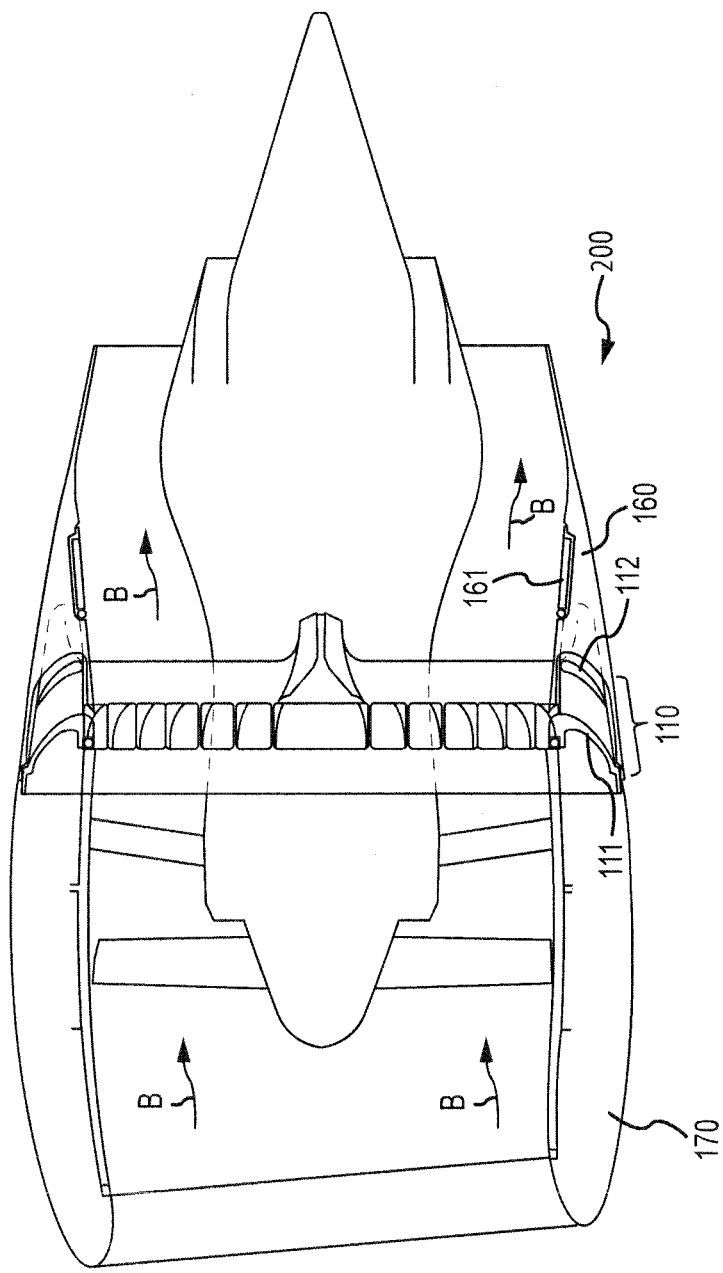
FIG. 2B illustrates a longitudinal section view of a thrust reverser in cruise mode, in accordance with various embodiments.

FIG. 2B illustrates translating sleeve 160 in the stowed configuration. When translating sleeve 160 is in the stowed configuration, blocker door 161 may be stored against or within translating sleeve 160 and translating sleeve 160 may seal against fan cowl 170 and torque box 110. Accordingly, when translating sleeve 160 is in the stowed configuration, air may flow from forward (i.e., proximate fan cowl 170) to aft (i.e., proximate blocker doors 161) within thrust reverser 200, as indicated by arrows B.

Figure 3:
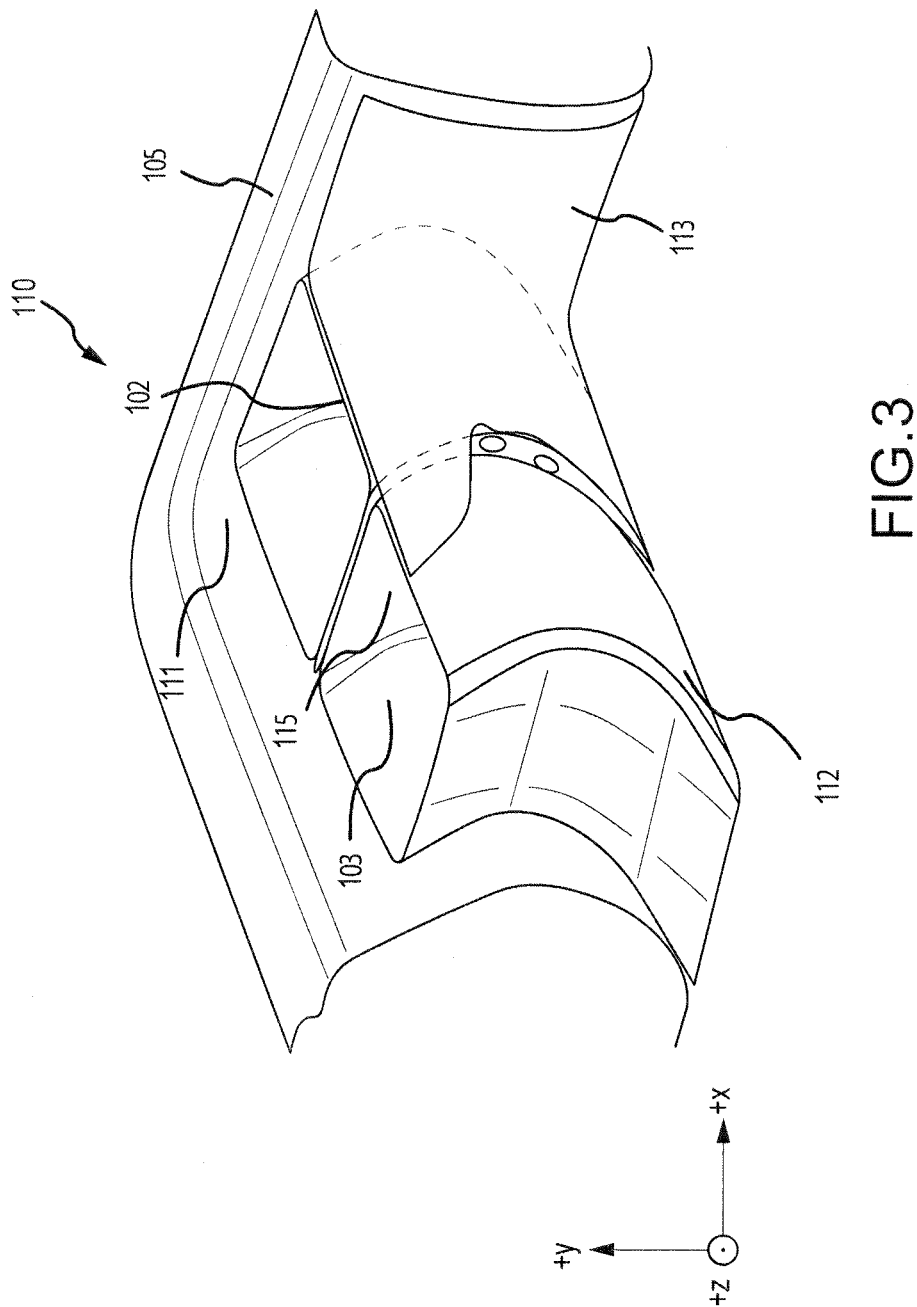
FIG. 3 illustrates a portion of a torque box in accordance with various embodiments.

With reference to FIG. 3, sectional view of torque box 110 is illustrated according to various embodiments. Torque box 110 may comprise hinge beam 105, forward wall 111, and aft wall 112. According to various embodiments, both forward wall 111 and aft wall 112 may have a bullnose profile and be connected to hinge beam 105 to support a torque load. Torque box 110 may also comprise a vane 115 coupled to an aft surface 103 of forward wall 111 and a forward surface 102 of aft wall 112. According to various embodiments, the aft surface 103 of the forward wall 111 and the forward surface 102 of the aft wall 112 may be configured to direct air flow in a forward direction (i.e., toward forward wall 111) and the vane 115 may be configured to direct air flow radially outward.

For example, with continued reference to FIG. 3, vane 115 may be curved to direct airflow radially outward. Moreover, as illustrated in FIG. 3, torque box 110 may be an integrated torque box in various embodiments. As used herein, an "integrated torque box" may include a torque box wherein the forward wall 111, the aft wall 112, and the vane 115, form an integrated piece. In various embodiments, at least one of the forward wall 111 and the aft wall 112 may be integrated with hinge beam 105. In various embodiments, torque box 110 may be a torque box with an integrated axial vane. As used herein, the term "integrated" or "integral" may include forming one single continuous piece. For example, a torque box with an integrated hinge beam may include a torque box wherein the hinge beam forms part of a continual piece with at least one of the forward wall and the aft wall. Without being limited to any theory, it is believed that the integration of smooth aerodynamic composite surfaces may improve the ability of the torque box to translate torque loads between the torque box and the thrust reverser beam structures while directing large amounts of air forward when the thrust reverser is deployed.

The torque box may comprise any known materials suitable for torque box construction or hereafter developed. For example, the torque box may comprise metals such as at least one of steel, aluminum, titanium, tungsten, nickel, and alloys thereof. The torque box may also comprise any known composite material suitable for torque box construction or hereafter developed. Exemplary composite materials include carbon composites (i.e., materials containing carbon fibers), such as a carbon-fiber-reinforced polymer. As used herein, the term "carbon-fiber-reinforced polymer" may include any known or hereinafter developed fiber-reinforced polymer that contains carbon fibers, such as graphite epoxy. Additional examples according to various embodiments include aramid fibers, such as Kevlar®, a registered mark of the E. I. Du Pont de Nemours and Company, Nomex®, also a registered mark of the E. I. Du Pont de Nemours and Company, and Technora®, a registered mark of the Teijin Corporation. The process for manufacturing the composite materials is not particularly limited and may comprise any known method or any method hereinafter developed. For example, in various embodiments, the composite material of the torque box may be formed by a resin transfer molding ("RTM") process. As used herein, RTM may include processes where fabrics may be fashioned for injection of resin polymers (with or without the assistance of a vacuum). In various embodiments, the RTM process may include the use of foam filled or pre-fitted syntactic-foam preforms.

With continued reference to FIG. 3, various embodiments of disclosed torque boxes may include torque boxes wherein the aft wall 112 is reinforced with a composite material 113. In various embodiments, reinforcement of the aft surface of aft wall 112 with a composite material 113 may improve the ability of the aft wall 112 to simultaneously withstand torque loads when the thrust reverser is deployed and directing air flow in a forward direction.

According to various embodiments, at least one of the forward wall 111, the aft wall 112, and the vane 115 may generally be deep in section (e.g., having increased height along the positive y-axis of FIG. 3, where the forward and/or aft wall have a smaller ellipse ratio (i.e., closer to 1:1), etc.) to allow for smooth aerodynamic turning. In various embodiments, the forward wall 111, the aft wall 112, and the vane 115 may be interlocked in construction, which may provide an increased structural stiffness to torque box 110. According to various embodiments, torque box 110 may comprise a plurality of vanes. In various embodiments, the vanes may be blended with the forward and the aft wall to provide for smooth load transitions between traverse and beamed structures.

In various embodiments, structurally connecting the forward wall and the aft wall with the hinge beam may increase assembly stiffness while allowing for a more axially compact thrust reverser. Stated another way, this may help to reduce the distance between the aft wall and the translating sleeve, thus shortening the length of the nacelle in both thrust reversers with cascades and cascadeless-thrust-reversers. Furthermore, in various embodiments, disclosed torque box configurations may offer less aerodynamic constriction, improving mass air flow forward and radially outward. By improving mass air flow, cascade length may be decreased, improving the efficiency of thrust reversers and reducing the cost, complexity, weight, and maintenance of cascades used in thrust reverser systems.

Figure 4:
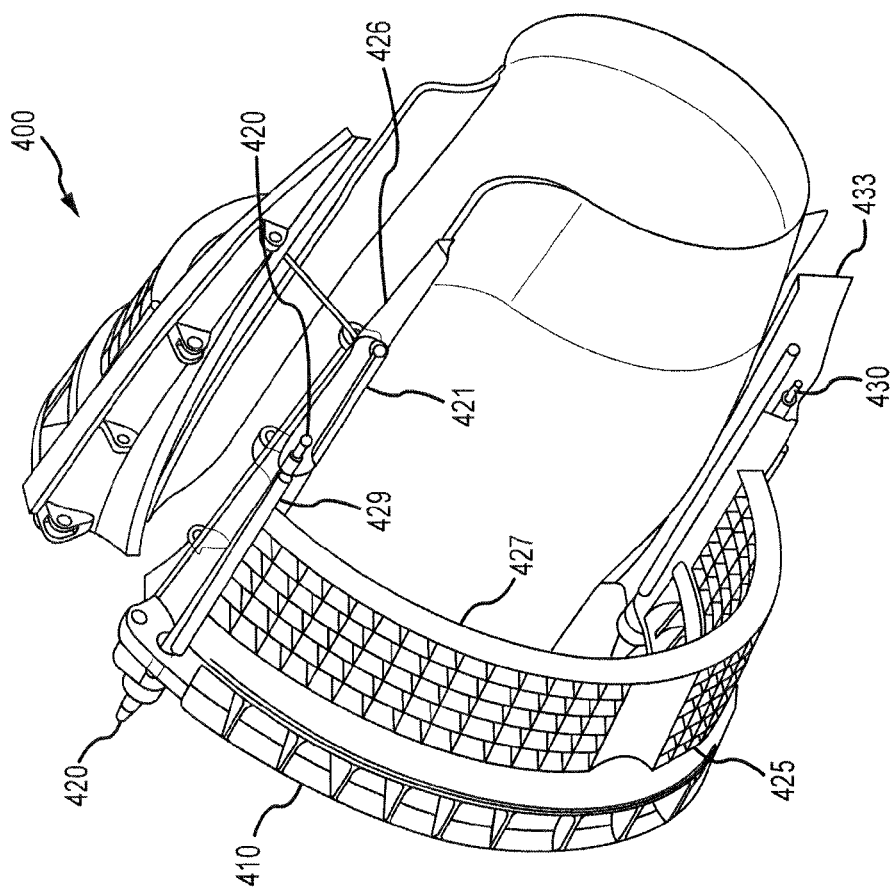
FIG. 4 illustrates a thrust reverser, in accordance with various embodiments.

With reference to FIG. 4, FIG. 4 illustrates a thrust reverser 400 with a cascade module 425 according to various embodiments. According to various embodiments, thrust reverser 400 may comprise hinge beam 426 which comprises part of torque box 410. According to various embodiments, hinge beam 426 may be an integral part of torque box 410. In various embodiments, cascade module 425 may be connected to torque box 410. In various embodiments, cascade module 425 may be attached to hinge beam 426 of torque box 410 with cascade aft attach ring 427. Moreover, in various embodiments, cascade module 425 may be attached to latch beam 433 with cascade aft attach ring 427.

Upper TRA 420 and lower TRA 430 may be disposed in the hinge beam 426 and latch beam 433 of torque box 410 respectively, so as to allow for the translating sleeve (not shown) to translate. In various embodiments, thrust reverser 400 may also comprise outer slider track 429 and inner slider track 421 and aid in the movement of the translating sleeve.

Figure 5A:
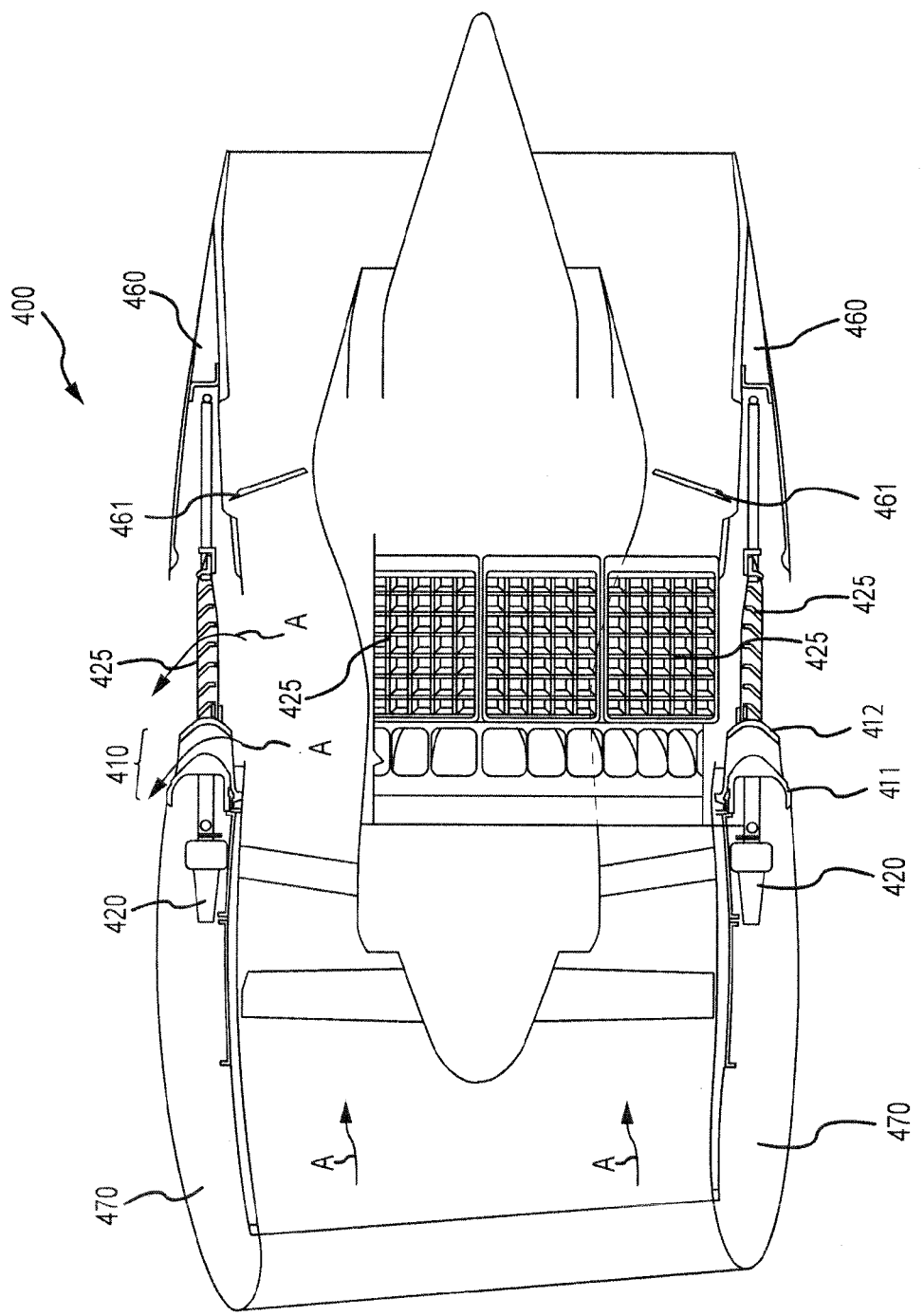
FIG. 5A illustrates a longitudinal section view of a thrust reverser, in accordance with various embodiments.

With respect to FIG. 5A, FIG. 5A illustrates thrust reverser 400 with the translating sleeve 460 in the deployed or open position. When translating sleeve 460 is deployed with the extension of upper TRA 420 housed in fan cowl 470, blocker door 461 may become deployed according to various embodiments, blocking airflow in the aft direction. The blocking of the airflow may cause back-pressure which may help to direct air flow, as indicated by arrows A, between forward wall 411 and aft wall 412 of torque box 410 and through cascade module 425. In various embodiments, aft wall 412 may provide sufficient back-pressure to aid in the shortening of cascade module 425. According to various embodiments, cascade module may be a cantilever cascade module. For example, cascade module 425 may be connected to torque box 410, which may help to provide structural support for cascade module 425.

Figure 5B:
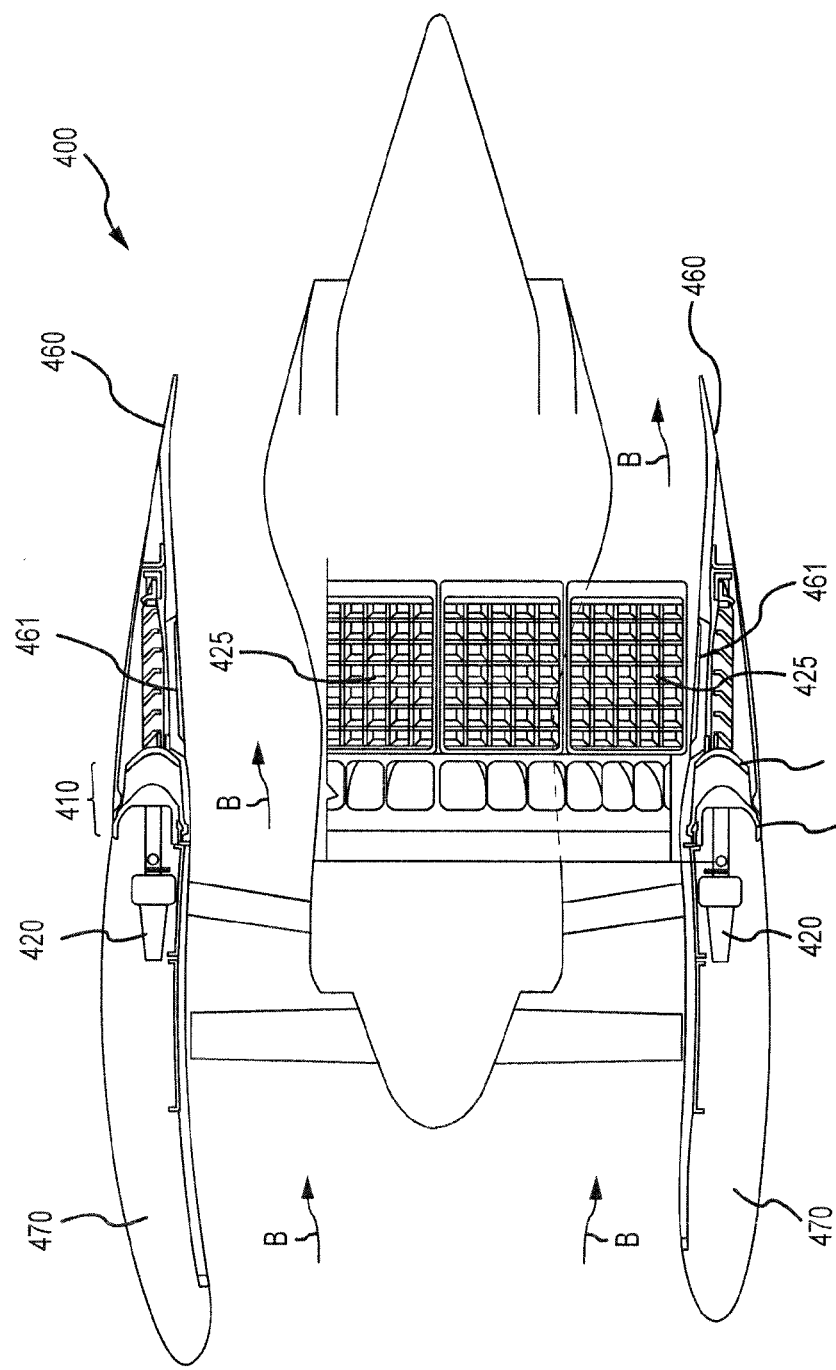
FIG. 5B illustrates a longitudinal section view of a thrust reverser, in accordance with various embodiments.

With temporary reference to FIG. 5B, FIG. 5B illustrates fan cowl 470 and thrust reverser 400, which is shown in the stowed configuration according to various embodiments. Thrust reverser 400 may comprise torque box 410 and translating sleeve 460 (shown in the stowed configuration). According to various embodiments, translating sleeve 460 may be configured to seal the outboard portions of torque box 410 and cascade module 425 when in the stowed configuration. Furthermore, according to various embodiments, translating sleeve 460 may be connected to upper TRA 420 and translating sleeve 460 also may comprise a blocker door 461. In various embodiments, blocker door 461 may help to seal the inboard portion of cascade module 425, which may help to improve aft airflow, as indicated by arrows B, when the thrust reverser is in the stowed configuration.

As stated above, the cascade module 425 may be connected to torque box 410, which may enable the forward wall 411 and the aft wall 412 of the torque box 410 to provide structural support for cascade module 425. The cascade however is not particularly limited and may include any known or developed cascade module. As used herein, the term "cascade module" may include any conventional known or developed cascade for use in thrust reversers. Exemplary cascade modules include integrated cascade modules where the cascade forms a single cascade section. Additional examples according to various embodiments include tapered cascade modules, where a portion of the cascade module is separable from another portion of the cascade module. According to various embodiments, tapered cascade modules may comprise a plurality of segmented tracks. For example, with reference to FIGS. 6A and 6B, torque box 610 is shown connected to various types of cascade modules according to various embodiments. In FIG. 6A, torque box 610 is shown with an integrated axial vane 611 and is connected to an integral cascade module 625. In FIG. 6B, torque box with an integrated axial vane 611 is shown connected to a tapered cascade module 626 comprising a plurality of segmented tracks 630, according to various embodiments.

The particular method of connecting a cascade module to the torque box is not particularly limited. According to various embodiments, the cascade module may be connected to the torque box with a web or with a bolt (e.g., a U-bolt). With reference to FIGS. 7A and 7B, FIGS. 7A and 7B illustrate various views of tapered cascade module 626 connected to torque box 610 according to various embodiments. In various embodiments, the use of tapered cascades may permit increased axial pitch and, thus, may allow for shorter arrays. FIG. 7A illustrates an outboard longitudinal view (with the translating sleeve removed for clarity) where torque box 610 is connected to tapered cascade module 626 with U-bolt 622. FIG. 7B illustrates a longitudinal sectional view of a thrust reverser in the stowed configuration, illustrating how U-bolt 622 may connect tapered cascade module 626 to torque box 610 in various embodiments. As can be seen in FIG. 7B, when in the stowed configuration, translating sleeve 660 may create an outboard barrier for torque box 610 and tapered cascade module 626 and blocker door 661 may create an inboard barrier for tapered cascade module 626 to improve aerodynamic performance of an aircraft nacelle when the thrust reverser is not deployed (i.e., in the stowed configuration).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser component comprising:
   a torque box comprising:
      a hinge beam;
      a forward wall having a first bullnose profile connected to the hinge beam to support a torque load, wherein the forward wall is configured to receive a load from a thrust reverser actuator;
      an aft wall having a second bullnose profile connected to the hinge beam to support the torque load, the aft wall located aft of the forward wall,
      wherein the forward wall and the aft wall extend circumferentially from the hinge beam to a latch beam; and
      a vane connected to an aft surface of the forward wall and a forward surface of the aft wall, wherein the aft surface of the forward wall and the forward surface of the aft wall are configured to direct air flow in a forward direction and the vane is configured to direct air flow radially outward.

2. The thrust reverser component of claim 1, wherein an aft surface of the aft wall is reinforced with a composite material.

3. The thrust reverser component of claim 1, wherein the forward wall has an ellipse ratio of about 2.25:1 to about 1.35:1.

4. The thrust reverser component of claim 3, wherein the ellipse ratio is about 2:1.

5. The thrust reverser component of claim 1, wherein the torque box comprises a carbon-fiber-reinforced polymer.

6. The thrust reverser component of claim 1, wherein the torque box is an integrated torque box.

7. The thrust reverser component of claim 1, wherein at least one of the forward wall and the aft wall is integrated with the hinge beam.

8. The thrust reverser component of claim 1, wherein the torque box comprises an integrated axial vane.

9. A thrust reverser comprising:
   a translating sleeve;
   a blocker door mounted to the translating sleeve;
   an actuator coupled to the translating sleeve; and
   a torque box comprising
      a hinge beam;
      a forward wall having a first bullnose profile connected to the hinge beam to support a torque load, wherein the forward wall is configured to receive a load from the actuator;
      an aft wall having a second bullnose profile connected to the hinge beam to support the torque load, the aft wall located aft of the forward wall,
      wherein the forward wall and the aft wall extend circumferentially from the hinge beam to a latch beam; and
      a vane connected to an aft surface of the forward wall and a forward surface of the aft wall, wherein the aft surface of the forward wall and the forward surface of the aft wall are configured to direct air flow in a forward direction and the vane is configured to direct air flow radially outward.

10. The thrust reverser of claim 9, further comprising a cascade module connected to the torque box.

11. The thrust reverser of claim 10, wherein the cascade module is a cantilever cascade module.

12. The thrust reverser of claim 10, wherein the cascade module is a tapered cascade module.

13. The thrust reverser of claim 9, wherein the forward wall has an ellipse ratio of about 2.25:1 to 1.35:1.

14. The thrust reverser of claim 13, wherein the ellipse ratio is about 2:1.

15. The thrust reverser of claim 9, wherein the aft wall is reinforced with a carbon composite.

\* \* \* \* \*